United States Patent [19]
Treu, Jr.

[11] Patent Number: 5,945,768
[45] Date of Patent: Aug. 31, 1999

[54] PIEZOELECTRIC DRIVE CIRCUIT

[75] Inventor: Charles A. Treu, Jr., Raymore, Mo.

[73] Assignee: AlliedSignal Inc., Morris Township, N.J.

[21] Appl. No.: 08/853,500

[22] Filed: May 8, 1997

[51] Int. Cl.[6] .................................................. H01L 41/08
[52] U.S. Cl. ........................................................ 310/316.01
[58] Field of Search ................................... 310/316, 317, 310/323; 318/116

[56] References Cited

U.S. PATENT DOCUMENTS

| | | | |
|---|---|---|---|
| 4,658,172 | 4/1987 | Izukawa | 310/316 |
| 4,879,528 | 11/1989 | Gotanda | 310/316 X |
| 4,888,514 | 12/1989 | Takahashi et al. | 310/316 |
| 5,021,700 | 6/1991 | Takahashi et al. | 310/316 |
| 5,023,526 | 6/1991 | Kuwabara et al. | 310/316 X |
| 5,101,144 | 3/1992 | Hirotomi | 318/116 |
| 5,130,598 | 7/1992 | Verheyen et al. | 310/316 |
| 5,130,619 | 7/1992 | Izuno | 318/116 |
| 5,153,486 | 10/1992 | Hirotomi | 318/116 |
| 5,173,631 | 12/1992 | Suganuma | 310/316 |
| 5,436,521 | 7/1995 | Kataoka | 310/317 |
| 5,459,370 | 10/1995 | Kataoka | 310/317 |
| 5,563,464 | 10/1996 | Okubu et al. | 310/316 |

OTHER PUBLICATIONS

*Crystal Oscillator Circuits*, by Robert J. Matthys, pp. 10–13, 52–56, 85–89, 1983.

*Primary Examiner*—Mark O. Budd
*Attorney, Agent, or Firm*—Stinson, Mag & Fizzell P.C.; Frank B. Flink, Jr.

[57] ABSTRACT

A piezoelectric motor drive circuit is provided which utilizes the piezoelectric elements as oscillators and a Meacham half-bridge approach to develop feedback from the motor ground circuit to produce a signal to drive amplifiers to power the motor. The circuit automatically compensates for shifts in harmonic frequency of the piezoelectric elements due to pressure and temperature changes.

16 Claims, 7 Drawing Sheets

PIEZOELECTRIC DRIVE CIRCUIT

The United States Government has rights in this invention pursuant to contract number DE-AC04-76-DP00613 with the United States Department of Energy.

BACKGROUND

The present invention generally relates to piezoelectric motors and similar devices. More specifically, the present invention relates to a unique electrical circuit to drive traveling wave piezoelectric motors and related piezoelectric devices.

Devices such as piezoelectric traveling wave motors, which will be referred to herein simply as piezoelectric motors, are devices which utilize deformation of small piezoelectric elements to provide motive force. The elements used in such devices are piezoelectric ceramics or crystals which deform when exposed to an electric field. By exposing a set of piezoelectric elements to a series of timed electrical pulses, a motion can be derived from the elements. Piezoelectric motors are increasingly found in common uses in today's society, such as in drives to operate lenses on automatic cameras, drives to operate curtains and shades, and a variety of other uses requiring small lightweight, inexpensive, and reliable motors.

Piezoelectric vibration devices, such as piezoelectric motors and actuators use an oscillating voltage electrical source to cause the piezoelectric elements to vibrate. In particular, traveling wave piezoelectric motors depend upon generation of two standing waves displaced both a quarter wavelength in time and in space to form a traveling wave in the motor stator. This is typically accomplished by feeding a sine wave and a cosine wave (i.e., a sine wave and a sine wave displaced a quarter wavelength in time) to elements displaced a quarter wavelength spatially around the stator. General motor circuit and timing considerations are discussed in the application of Charles Mentesana, U.S. application Ser. No. 08/628,141, filed Apr. 4, 1996 ("Mentesana") which is incorporated herein by reference. (Both Mentesana and the present application are assigned to a common entity.) In order to most effectively induce the traveling wave, piezoelectric motor drive circuits are designed to produce these standing and traveling waves at or near frequencies at which the motor is resonant.

One characteristic of piezoelectric motors is that the resonant frequency of the motor changes in accordance with the temperature and pressure experienced by various portions of the motor, and especially the piezoelectric elements. Changes in ambient temperature, heating of the motor elements due to friction, electrical resistance, and the like cause significant temperature shifts in the motor. Similarly, in operation, the motor rotor is in contact with the motor stator, the pressure of which contact varies in operation due to various factors including temperature changes and motor wear. As a result of these pressure and temperature changes, significant changes in motor operating frequency result during motor operation. It is noted that the resonant frequency is also dependent upon motor torque, motor configuration, and similar factors. However, the primary variable operational factors are pressure and temperature. For simplicity, references herein to temperature and pressure factors affecting the harmonic frequency, include such other factors.

One approach to driving these piezoelectric motors has been to generate electrical pulses with set frequencies to drive the motor. This approach limits the operating range and efficiency of the motor because the selected frequency generally is a compromise between the range of harmonic frequencies anticipated in motor operation.

Another approach is to utilize complex circuits to provide the required series of electrical pulses or waveforms in conjunction with complex schemes to modify the driving frequency to account for changes in the harmonic frequency of the piezoelectric elements due to temperature and pressure changes. Examples include U.S. Pat. No. 5,101,144 (Hirotomi); U.S. Pat. No. 5,130,598 (Verheyen), and U.S. Pat. No. 4,658,172 (Izukawa), which are hereby incorporated by reference. Generally, circuits similar to these are complex and costly to fabricate and can suffer from being sensitive to vibration and other circuit failures.

One approach has been to make use of the piezoelectric element as one leg of a full Meacham bridge circuit, such as generally is shown in U.S. Pat. No. 4,658,172. However, in using a full Meacham bridge approach, the power available to drive the piezoelectric element is severely limited because the current flow through the frequency-setting element is directly related to the input to the circuit amplifier. Basically, high current flows in the piezoelectric element overdrives the amplifier, thus limiting available current flow. Further, such circuits tend to be inefficient due to the number of passive circuit components required to form the bridge.

Other approaches utilize schemes to feed back pressure and temperature signals, and/or utilize those signals to modify the drive circuit frequency output. However, for example, to produce a temperature correction to the circuit, a thermocouple sensor may be utilized, which must be interconnected with the temperature correction circuitry. Added wiring such as this represents significant additional complexity in manufacturing as well as cost of the final installation. Further, because of their complexity, such circuits may be prone to component failure and may not provide an optimum operating frequency correction.

SUMMARY OF THE INVENTION

It is, therefore, an object of this invention to provide a circuit design for driving piezoelectric motors which inherently compensates for frequency mode changes due to changes in temperature, pressure, and like factors.

It is a related object of this invention to provide a circuit that is a simplified design which promotes ease of manufacture and is therefore less costly to fabricate, is more reliable and is simpler to manufacture.

It is a further object of this invention to provide a circuit which may be balanced to enhance overall electrical efficiency of the resulting circuit and motor system.

It is a related object to provide a self-compensating circuit which has increased power characteristics while maintaining a simplified circuit design.

Other and further objects and aims of this invention will become apparent in the specification, claims and appended drawings.

The present invention is directed to a circuit to drive piezoelectric motor devices that satisfies the needs to enhance motor drive circuit reliability, simplify manufacturing, and, thus, reduce cost. The circuit basically is a half Meacham bridge crystal oscillator circuit in which the piezoelectric device is utilized as a crystal oscillator to establish the basic frequency mode of the circuit by balancing the ground side of the piezoelectric motor elements.

Some advantages of this invention include requiring only three wires to connect the motor to the electrical drive circuit; in some aspects, both phases of piezoelectric elements are in the drive circuit loop enhancing motor balance stability; the motor can be driven directly by amplifiers configured as phase shifters, increasing the available drive power as compared to some existing configurations; and the circuit inherently tends to drive at a natural harmonic of the motor because the frequency is set by the piezoelectric element acting as a crystal oscillator. Because the piezoelectric element sets the frequency of the drive circuit, changes in frequency due to pressure and temperature are automatically corrected.

BRIEF DESCRIPTION OF THE DRAWINGS

The features and advantages discussed above, as well as other features, aspects, and advantages of the present invention are further revealed by reference to the following description, claims, and accompanying drawings. With respect to the appended drawings:

DESCRIPTION OF THE PRESENT INVENTION AND PREFERRED EMBODIMENTS

The present invention is a piezoelectric element drive circuit in which the piezoelectric element is utilized as an oscillator in the drive circuit and in which the feedback from the piezoelectric device is derived from the current flow through the elements. The principal use of such a circuit is to drive various types of piezoelectric traveling wave motors and, therefore, the embodiments described herein are aimed to that end use. However, the present invention circuits may also be utilized to drive piezoelectric elements in non-motor applications, such as ultrasonic vibration devices.

Because the piezoelectric elements of a piezoelectric motor are ceramics which behave like crystals, the piezoelectric elements function as a crystal oscillator in the circuit to self-generate a signal at the harmonic frequency of the piezoelectric element. The present invention utilizes a unique combined ground-side electrical feed from the piezoelectric elements to derive the appropriate phase-separated waves in order to automatically derive the harmonic frequency of the individual piezoelectric elements. This configuration forms a Meacham half-bridge circuit. In some embodiments, an impedance element is utilized in the ground circuit to create a back-voltage signal, which voltage signal is the superimposed combined current of the piezoelectric motor ground currents. In other embodiments, the piezoelectric element is coupled through a transformer to isolate the piezoelectric element and allow production of a back voltage feedback signal. This back voltage is utilized as a signal feed to drive phase shifting and amplification circuits which, in turn, drive the motor elements.

The following discussion of embodiments of this invention are instructive to describe workable configurations of the present invention. These embodiments show some of the variety of configurations applicable to the present invention and demonstrate some of the considerations which would need to be taken into account when applying the current invention to a specific situation. In particular, various electrical configurations and element configurations are shown in the figures and described herein are exemplary embodiments of the various combinations of electrical configurations and are not intended to limit the scope of the current invention.

Figure 1:
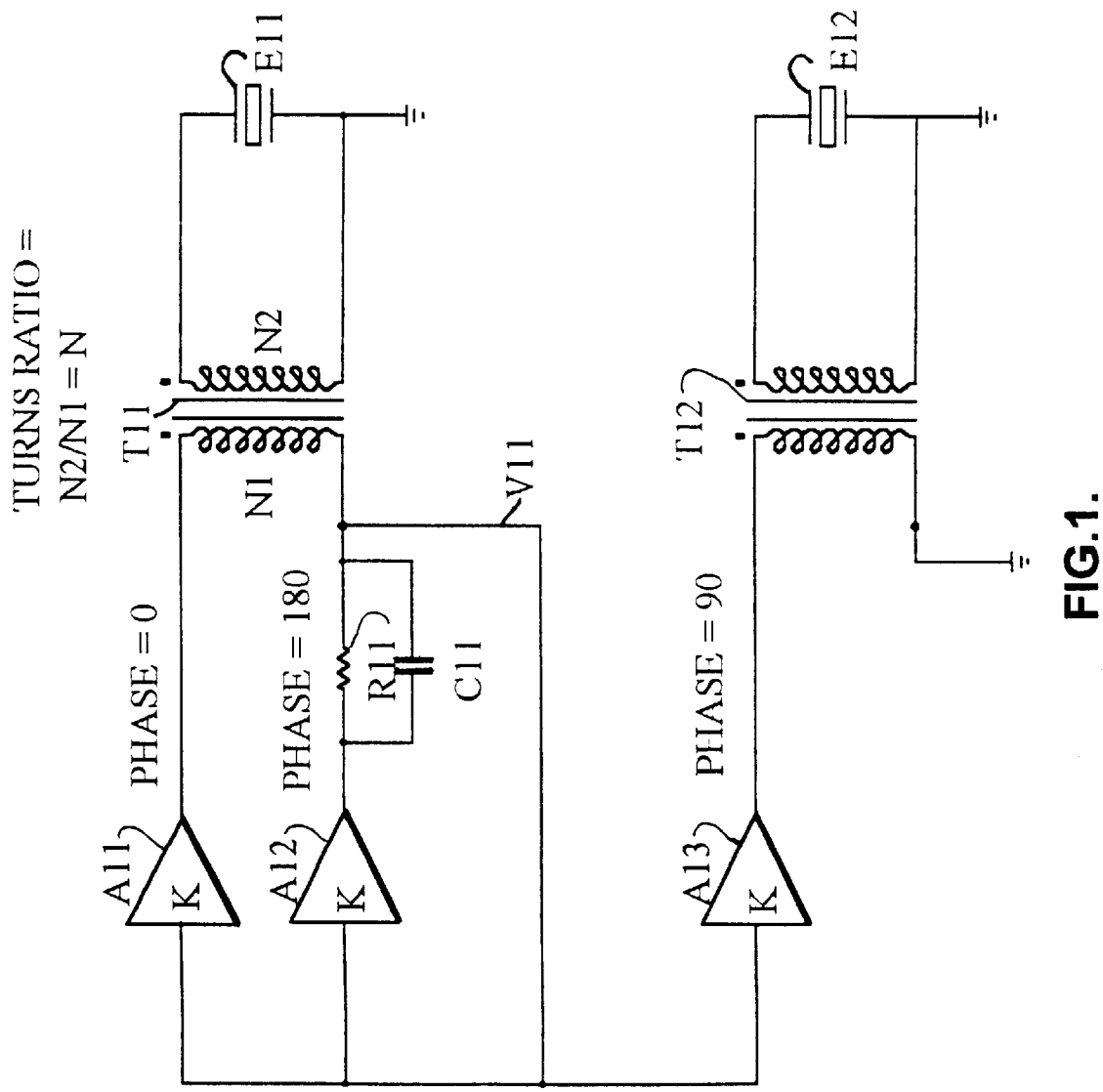
FIG. 1 is a first preferred embodiment of the present invention.

One preferred embodiment of the present invention is generally depicted in FIG. 1. In this embodiment, motor elements, shown as E11 and E12, are connected through transformers T11 and T12 to phase-shifting amplifiers A11, A12, A13, with the signal modified by resistor R11 and parallel capacitor C11. A reference point V11 is also identified. The circuit is an oscillator design based upon a Meacham half-bridge concept which uses the piezoelectric motor element E11 as the frequency sensitive element to sustain oscillation and therefore adapts the drive signal to changes in the resonant frequency of the motor due to pressure and temperature variations. Reference herein to a Meacham half-bridge circuit includes the balance bridge concepts incorporated in the following embodiments.

The operation of the embodiment shown in FIG. 1 is advantageously explained by reference to FIGS. 2 and 3. In FIG. 3, capacitors Cd and Cm along with inductor Lm and resistor Ro represent an equivalent circuit for a piezoelectric element, denoted by the phantom line as E31. The equivalent components Cm and Lm are commonly referred to as motional capacitance and inductance, respectively and represent electrical characteristics of a piezoelectric element which vary with temperature and pressure. Equivalent component Cd is typically referred to a shunt capacitance and equivalent component Ro is referred to as series resistance; both are generally invariant under temperature and pressure changes, as compared to the harmonic considerations resulting from components Cm and Lm. For general reference, in a typical piezoelectric element commonly used in piezoelectric motors, Lm is on the order of 1 Henry (H), Cm is typically 4–7 Pico Farads (pF), Ro is on the order of 20–200 Ohms, Cd is on the order of 1,000 to 30,000 pF.

The purpose of the circuit shown in FIG. 3, a Meacham half-bridge circuit, is to produce a null signal at the test point shown as Vo at a harmonic frequency of the piezoelectric element E31. Because the value of parallel capacitance Cd is much greater than Cm, the harmonic frequency response primarily is controlled by components Lm and Cm. A null signal at Vo is advantageously accomplished by applying sine wave signals which are 180° out of phase with the equivalent piezoelectric element E31 on one side of Vo and to a parallel resistor Rs and capacitor Cs on the other side of Vo. If the resistor Rs and capacitor Cs are sized to have approximately the same value as the series resistance, Ro and shunt capacitance Cd, respectively, of the piezoelectric element E31, it readily may be seen that the effect of components Ro and Cd at point Vo may effectively be canceled, leaving the effect of components Lm and Cm. Because the values of components Lm and Cm are much more temperature and pressure dependent than those of components Cd and Ro; changes to the resonant frequency of the element E31 due to pressure and temperature are due to the contribution of components Lm and Cm. The impedance of components Lm, Ro, Cm may be given by:

$$Z = Ro + j2\pi f Lm + 1/j2\pi f Cm$$

where Z is impedance, j is the imaginary operator, $f$ is frequency. At resonance, $f$ is such that the inductive and capacitive portions of the equation cancel, minimizing Z and eliminating phase shift. Since, at resonance the contributions of components Lm and Cm cancel, and, effectively Lm and Cm may be ignored at resonance. Thus, if a resistor and capacitor approximately equivalent to components Cd and Ro, i.e., components Cs and Rs, are included in the circuit as shown, at the junction of those components and the piezoelectric device E31, both the voltage at that junction, Vo, and the phase angle approach zero at resonance of the piezoelectric element. Further, at frequencies away from resonance the voltage becomes non-zero because the effect of components Lm and Cm no longer cancel and the phase angle approaches either 180° or −180° as depicted in FIG. 2, depending upon whether the effect of component Lm or Cm controls. If the output voltage Vo is used as positive feedback to an amplifier, an oscillator can be constructed. It is noted that FIG. 2 is a plot of a piezoelectric element which was connected to a half Meacham bridge and operated over a range of frequencies. The plot thus produced shows the phase angle and voltage amplitude (as gain) versus frequency. Element harmonic occurs where the phase angle is zero and the gain is minimized.

Turning back to FIG. 1, it may be readily seen that a circuit operationally similar to that shown in FIG. 3 is formed. In the circuit shown in FIG. 1, the impedance created by current flow through element E11 is reflected through transformer T11 as the inverse of the square of the turns ratio N. If components R11 and C11 are selected with values appropriately scaled to account for the reflected impedance in the equivalent components of the piezoelectric element E11, a summing node effect similar to that discussed in reference to FIG. 3 is seen at point V11. It is noted that the value of series resistor R11 is selected to be slightly higher than the reflected series resistance of element E11 in order to assure positive gain to sustain oscillation. The summing node voltage is fed to the inputs of amplifiers A11, A12, and A13, respectively. The amplifiers are selected to have sufficient gain to sustain oscillation and have the 0°, 90°, and 180° phase shifts required. As one skilled in the art would realize, a variety of combined amplification units and the like are available which provide equivalent functions, as well as are variations on the circuitry shown which would produce similar results. For example, balancing capacitor C11 may be eliminated with appropriate rescaling of R11. Although this causes some degradation in circuit stability and pressure and temperature correction capabilities, such a circuit provides a viable alternative embodiment of the present invention.

It is noted that typically one side of each of the piezoelectric elements is interconnected or "common." Further, the current from the common point of the piezoelectric elements is the sum of the currents through both elements making direct use of the Meacham half-bridge difficult unless an additional amplification step is used to float the common terminal. However, such an additional amplification step adds significantly to the complexity of the resulting circuit. By using transformers T11 and T12 as shown in FIG. 1, the current for each element can be isolated, allowing detection of harmonic frequency for E11 separate from E12. In this approach, the impedance of the piezoelectric element is reflected to the transformer primary as described above and an equivalent of a Meacham half-bridge circuit topology is realized.

Figure 2:
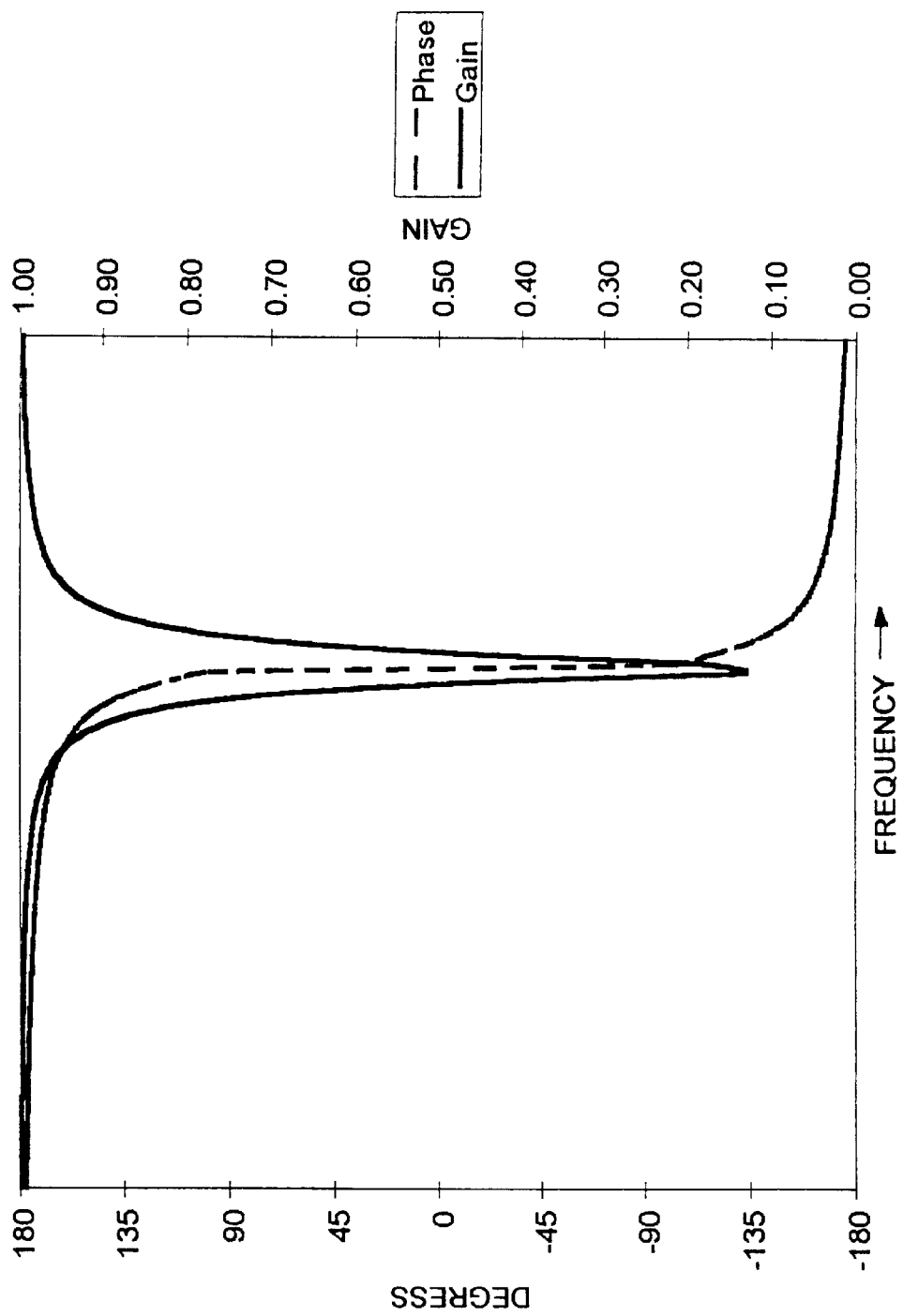
FIG. 2 is a phase diagram illustrating frequency stabilizing characteristics of the embodiments shown in FIGS. 1, 4 and 5.
Figure 3:
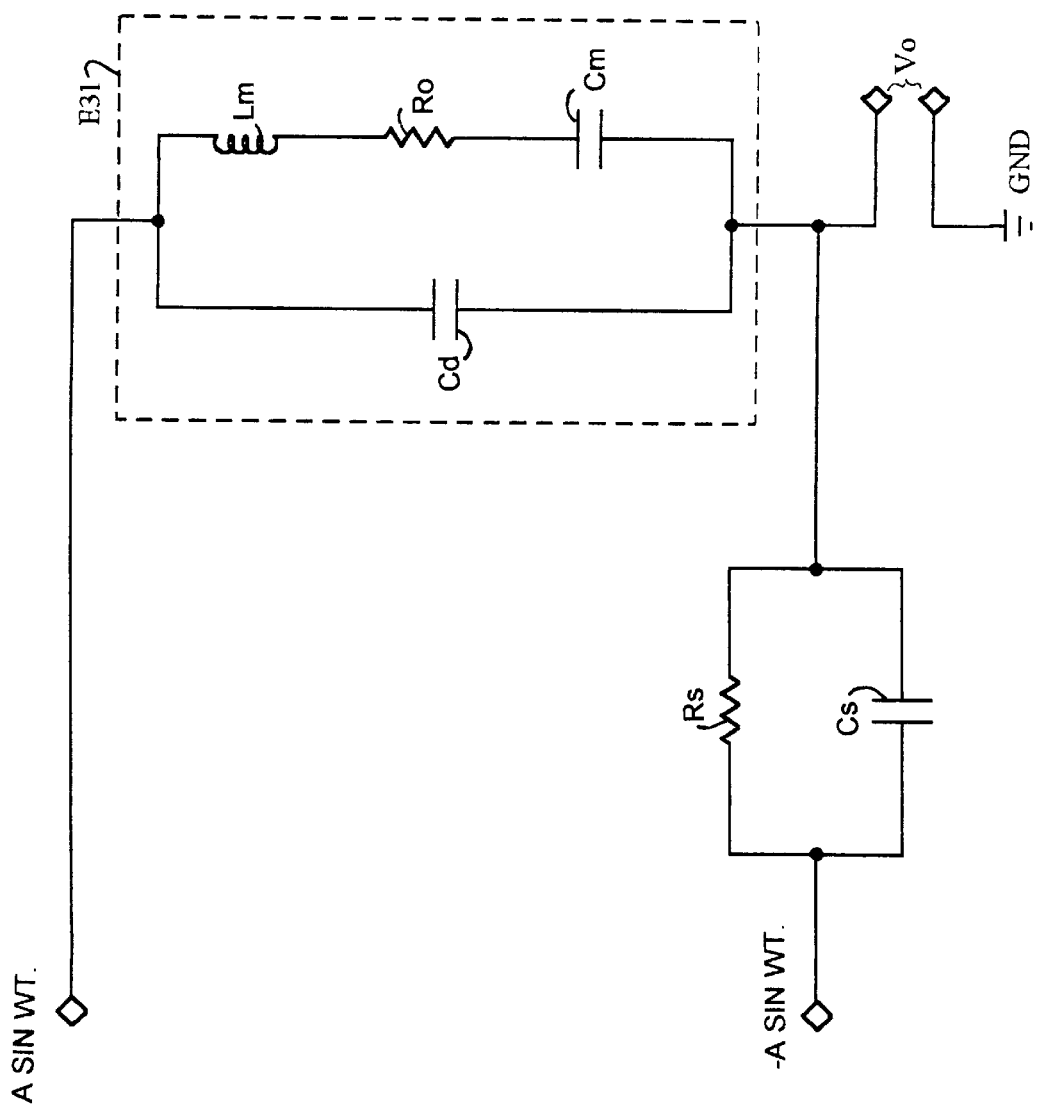
FIG. 3 is an illustrative Meacham half bridge circuit.
Figure 4:
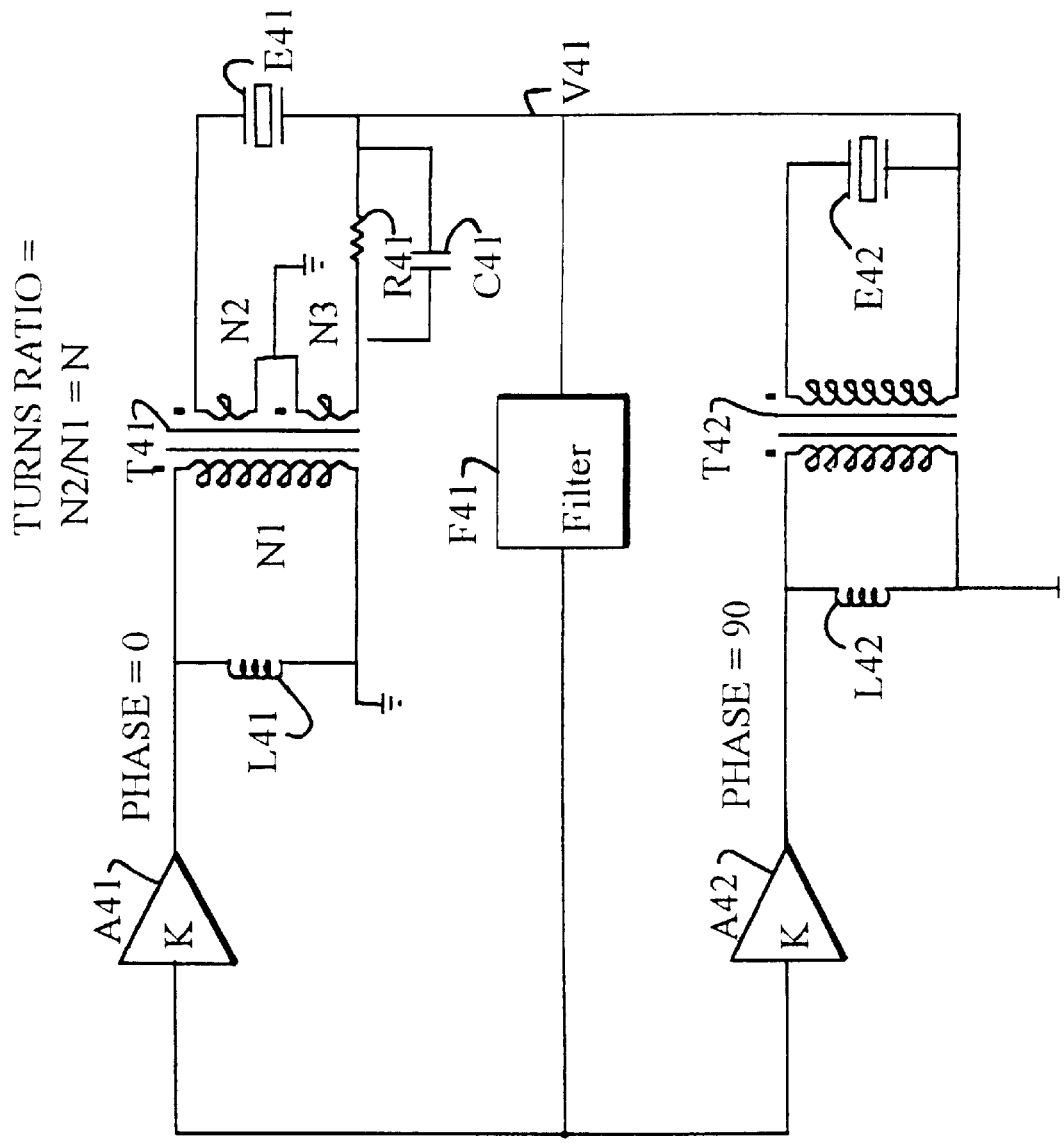
FIG. 4 is a second embodiment of the present invention.

FIG. 4 shows an alternative embodiment utilizing the same frequency balancing concept as is shown for the first embodiment in FIGS. 1–3, but including a number of enhancements and features which may advantageously be employed in the present invention. In this embodiment, motor elements, shown as E41 and E42, are connected through transformers T41 and T42 to amplifier A41 and phase-shifting amplifier A42, with balancing components resistor R41 and parallel capacitor C41. A filter F41 is shown in the circuit feedback and a reference point V41 is identified.

In this embodiment, the reference point, V41, balancing resistor R41, and capacitor C41, are moved to the other side of the transformer T41 as compared to the embodiment shown in FIG. 1. If transformer T41 is a center tap ground unit, the effective potential to ground experienced by R41 and C41 is 180° out of phase as compared to that expressed by element E41 and has a comparative absolute value related to the number of windings in the respective portions of the transformer, shown as N2 and N3. One result of the use of a center tap transformer is that a 180 degree phase shift amplifier is not required in this embodiment. Further, as the number of turns N3 is reduced as compared to N2, the resistance of resistor R41 correspondingly may be reduced and C41 increased while maintaining a balance at the summing point, V41. This, in turn, reduces overall loop impedance for the components, the piezoelectric element E41, transformer T41, and resistor/capacitor R41/C41, which results in increased efficiency of power conversion.

The embodiment shown in FIG. 4 utilizes inductor L41 as an additional efficiency enhancement. Inductor L41 offsets the capacitive effect of the various capacitive components discussed herein, to reduce the phase angle between current and potential in the system, thus improving the overall power factor of the system. Such an inductance may effectively be inserted at any number of points in the system or otherwise incorporated into other system components, such as transformer T41. In addition, because piezoelectric elements have a number of harmonic points, FIG. 4 shows a filter F41 which may advantageously be employed to limit available frequencies for motor operation.

Figure 5:
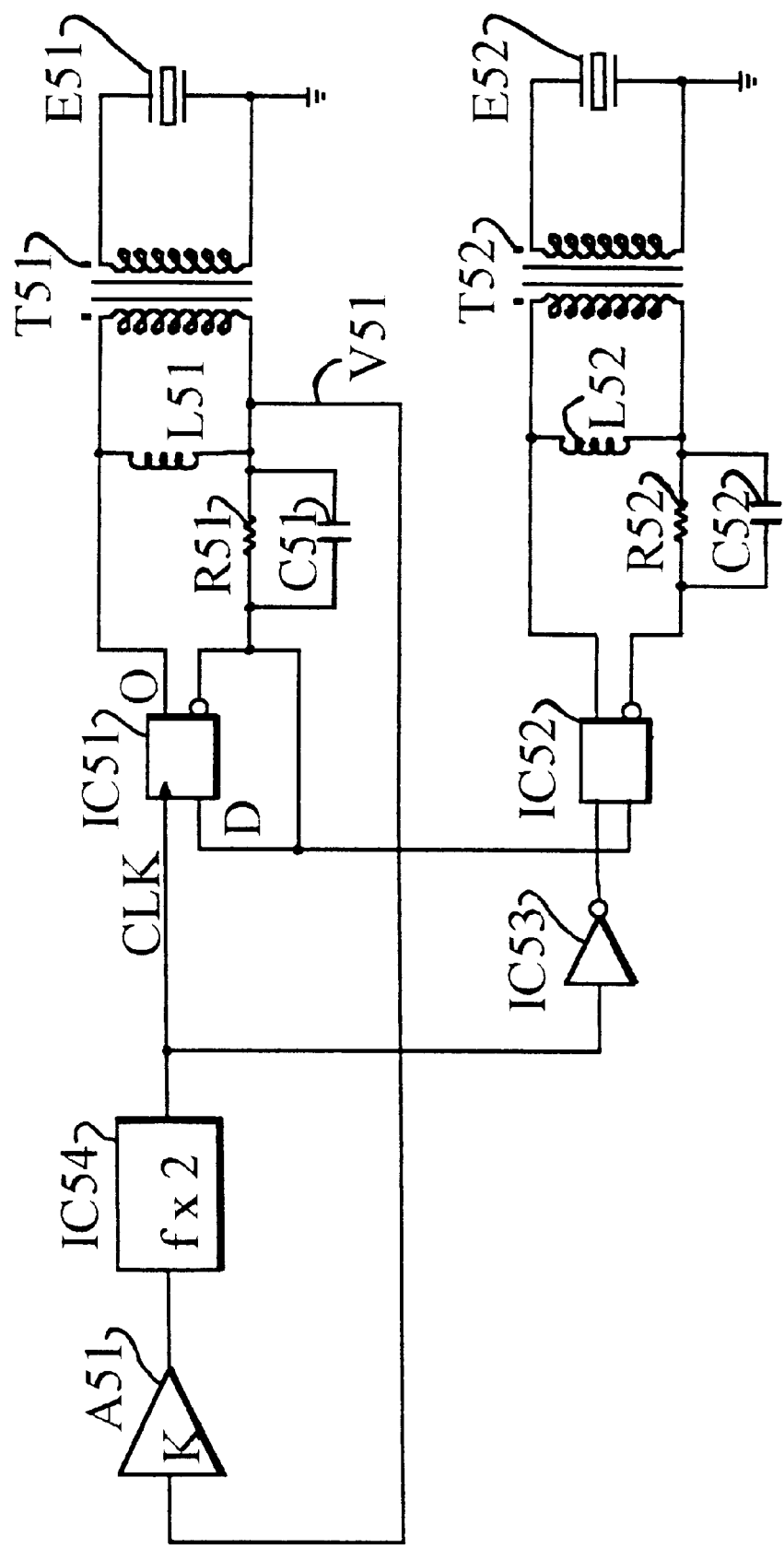
FIG. 5 is a third preferred embodiment of the present invention.

FIG. 5 shows a preferred embodiment well suited to low power applications, using digital integrated circuits (ICs). In this embodiment, motor elements, shown as E51 and E52, are connected through transformers T51 and T52 to digital amplifiers IC51 and IC52, with balancing components resistors R51 and R52 and parallel capacitors C51 and C52. A buffer/amplifier A51 is shown in the circuit feedback along with frequency multiplier IC54 and inverter IC53. A reference point V51 is identified.

The function of components R51 and C51 is to provide a null feedback as described for the embodiment shown in FIG. 1. Use of components R52 and C52 produce an equivalent effect in the second leg of the circuit using element E52, thus making the waveforms of E52 the same as the waveforms provided to element E51. In addition, because digital amplifiers IC51 and IC52 produce a square wave output, the presence of components R51/52 and C51/52 advantageously causes the square wave to be formed into a "rounded off" square wave, enhancing the efficiency of the motor. Similarly, inductors L51/52 balance capacitive effects of E51/52 and C51/52, improving system efficiency. The summing node voltage V51 is produced similarly to the methods described above, and will not be described again here. The feedback signal thus produced is provided to amplifier A51, which acts as a buffer and can be either a digital buffer integrated circuit, a linear amplifier or the like. The output of amplifier A51 is provided to frequency multiplier IC54, where the frequency of the signal is doubled. This doubling is required because, in order to produce a 90° phase shift output of component IC52, it is necessary to index IC52 from the IC51 feedback, which effectively halves the output frequency. Thus, the frequency output of IC51/52 is one half of the input frequency and, therefore, a doubler IC54 is required to maintain the desired frequency. Inverter IC53 provides a second signal to IC52, which must be configured to provide a signal 90° out of phase with the output of IC51.

In typical traveling wave piezoelectric motors, the common or ground side of all of the piezoelectric elements is interconnected. Thus, ground current flow is a combination of superimposed current flows from the elements. As noted above, in order to provide a true ±180° phase shift at a summing point, either isolation transformers are utilized as in the foregoing embodiments, or an elevated common voltage amplification system is required. The embodiment shown in FIG. 6 demonstrates an embodiment of the present invention in which isolation transformers are eliminated, but at some reduction in circuit stability. The embodiment shown in FIG. 6 consists of piezoelectric elements E61 and E62, which are interconnected at a common point, the summing point V61, and isolated from ground by impedance device Z61. Amplifiers A61 and A62 are interconnected to the feedback provided by means of a system of resistors, R61 to R68, and capacitors, C61 and 62, to produce the appropriate 0° and 90° phase shift required on the outputs of amplifiers A61 and A62.

In this embodiment, the ground current flow taken through an impedance device, Z61, produces a voltage equivalent to a product of the superposition of the combined currents from elements E61 and E62 taken through the impedance. Since these currents are required to be a sine wave and a sine wave displaced 90°, the resulting waveform at node V61 is a sine wave phase-shifted 45°, or one-eighth wavelength in time. If the voltage signal thus produced is provided to appropriate phase-shifting amplifiers, A61 and A62, through a phase-shifting network, such as components R67, R68, C61 and C62, the appropriate sine and cosine waves result for driving the piezoelectric elements. In this configuration, resistors R61 through R66 are used to control the respective gains of the amplifiers, and R67 and R68 along with C61 and C62 are used to set the phase shift. The required phase shift of the feedback signal at the input of amplifiers A61 and A62 is ±45° in order to produce the required 0° and 90° phase shifts on the output of amplifiers A61 and A62.

The ground impedance device Z61 can be selected to maximize feedback voltage at a resonant frequency of the motor. The feedback impedance can be a resistor, or a combination of frequency sensitive elements to enhance motor characteristics such as starting.

The signal produced at point V61 is the vector sum of the two the individual currents multiplied by the impedance value of Z61. As noted above, this results in a voltage signal at point V61 which normally is 45° offset. If the input frequency varies from the harmonic frequency of the elements E61 and E62, the phase shifts an additional ±90° from the 45° phase shift, thus correcting the frequency output of the amplifiers A61 and A62. See FIG. 7 which shows an exemplary curve of phase shift and signal strength at the summing point V61. However, the relative sharpness of the phase curve away from the ideal harmonic point is not as distinct as the one produced by embodiments utilizing the null balance. Compare FIG. 2 to FIG. 7. Thus, this embodiment does not provide as stable a circuit as the earlier embodiments. It is also of note that the signal at point V61 in this embodiment is maximized at resonance, see FIG. 7, as compared to the minimized feedback of the earlier embodiments.

Figure 6:
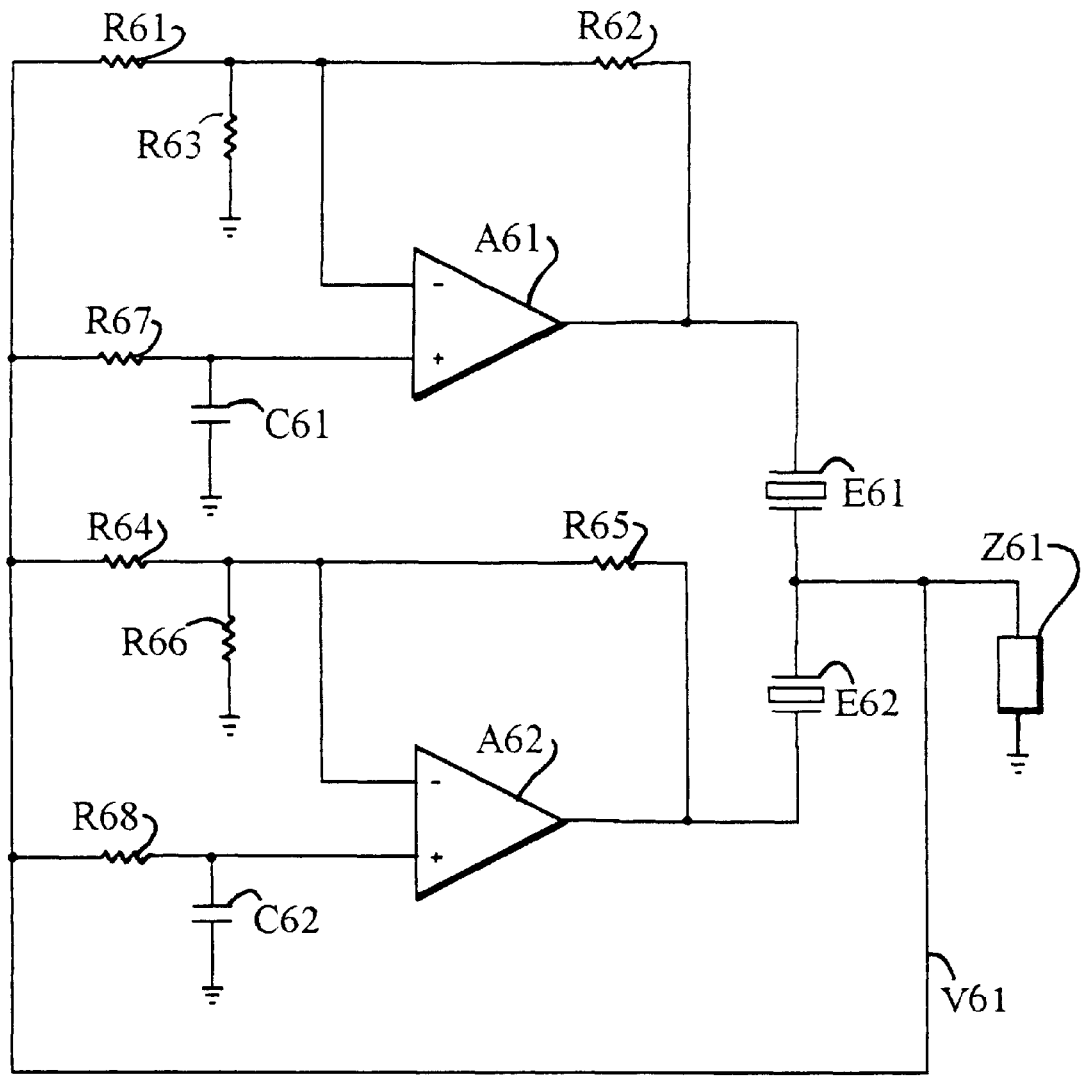
FIG. 6 is a fourth embodiment of the present invention.
Figure 7:
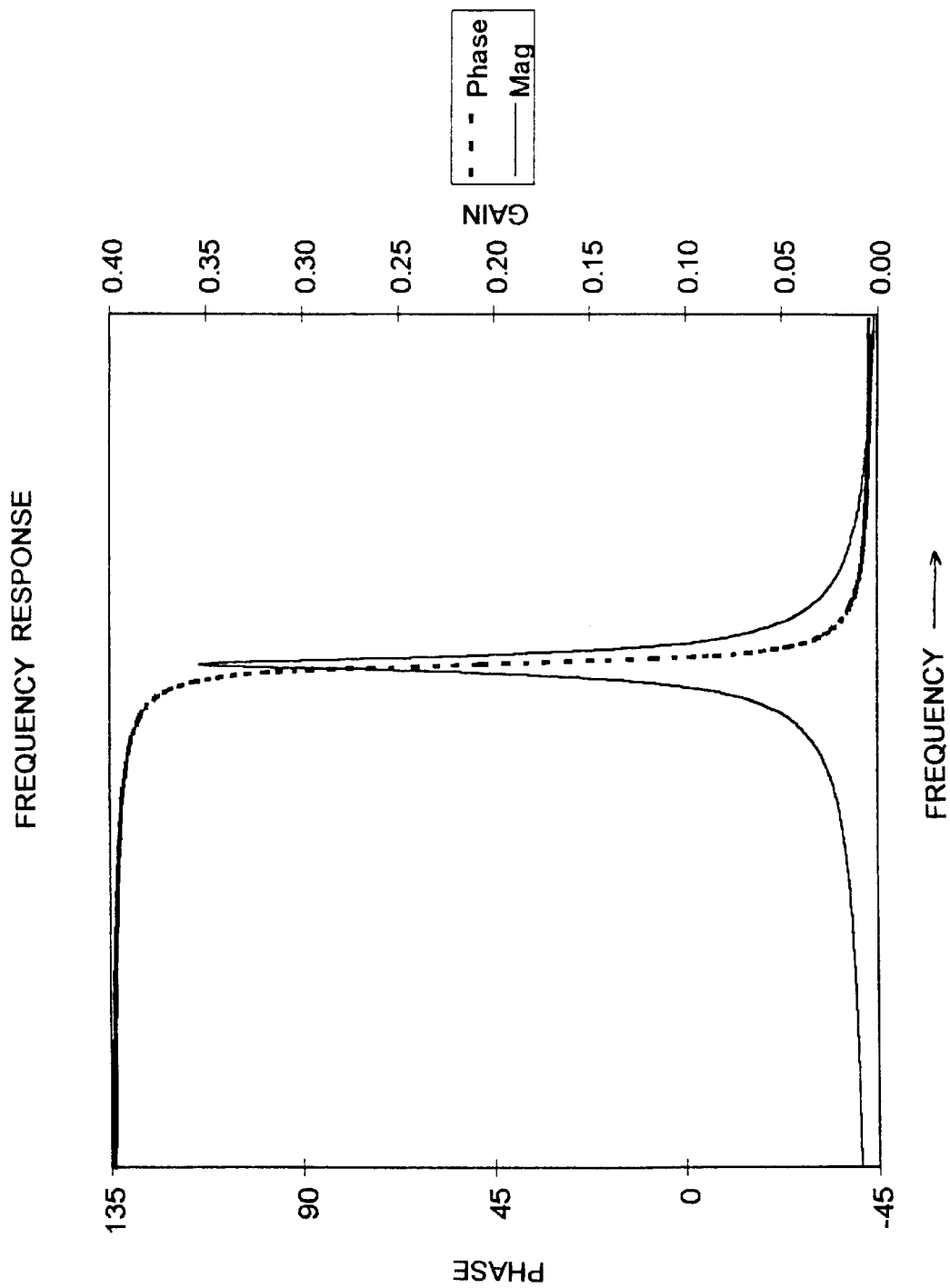
FIG. 7 is a phase diagram illustrating frequency stabilizing characteristics of the embodiment shown in FIG. 6.

It is noted that FIG. 7 is a plot of a piezoelectric elements configured generally as shown in FIG. 6 and operated over a range of frequencies. The plot thus produced shows the phase angle and voltage amplitude (as gain) versus frequency. Element harmonic occurs where the phase angle is 45° and the gain is maximized.

From the foregoing, it will be seen that this invention is well-suited to attain all the ends and objects set forth herein together with other advantages which are obvious and inherent to the invention.

It will be understood that certain features and combinations are of utility and may be employed without reference to other features and combinations. This is contemplated and within the scope of the invention.

Since many possible embodiments may be made of the invention without departing from the scope thereof, it is to be understood that all matters herein set forth or shown in the accompanying drawings are to be interpreted as illustrative and not in a limiting sense.

I claim:

1. A drive circuit for a vibration wave piezoelectric motor including piezoelectric elements having a harmonic frequency and interconnected at a common point, comprising:

oscillator circuit means for producing an electrical signal for driving the piezoelectric elements of the piezoelectric motor in which said oscillator circuit means is self-oscillating and said piezoelectric elements form a portion of said oscillator circuit means;

feedback circuit means for sensing current flow from said common point of said piezoelectric elements and providing a feedback signal to said oscillator circuit means, which feedback signal drives the frequency of said oscillator circuit means toward a harmonic frequency of said piezoelectric elements.

2. A drive circuit for a vibration wave piezoelectric motor as claimed in claim 1 in which said feedback circuit means is a Meacham half bridge circuit.

3. A drive circuit for a vibration wave piezoelectric motor as claimed in claim 1 in which said feedback circuit means includes a filter for selecting preferred frequencies of feedback signals.

4. A drive circuit for a vibration wave piezoelectric motor as claimed in claim 1 further comprising means for inductively balancing said oscillator circuit so as to improve drive circuit power factor.

5. A piezoelectric drive mechanism with piezoelectric elements which have a harmonic frequency that changes as a result of pressure and temperature comprising:

a traveling wave piezoelectric motor, which motor utilizes a first plurality of piezoelectric elements and a second plurality of piezoelectric elements, each said element with an input and an output, said element outputs being electrically interconnected;

an oscillator circuit with a first amplifier and a second amplifier, each said amplifier having an input and an output, the output of said first amplifier being operatively connected to the input of said first piezoelectric elements and the output of said second amplifier being operatively connected to the input of said second piezoelectric elements; wherein said oscillator circuit is self-oscillating and said piezoelectric elements are operable to provide said self-oscillation;

a feedback circuit operatively connected to the output of said piezoelectric elements to provide a frequency tracking signal which is operably connected to the oscillator circuit to cause the oscillator circuit to oscillate at a harmonic frequency of said piezoelectric elements.

6. A piezoelectric drive mechanism as claimed in claim 5 in which said feedback circuit is a Meacham half bridge circuit.

7. A piezoelectric drive mechanism as claimed in claim 5 in which said feedback circuit includes a filter for selecting preferred frequencies of feedback signals.

8. A piezoelectric drive mechanism as claimed in claim 5 in which said oscillator circuit includes a means for inductively balancing said oscillator circuit so as to provide improved oscillator circuit power factor.

9. A piezoelectric drive mechanism comprising:

a traveling wave piezoelectric motor, which includes a first plurality of piezoelectric elements and a second plurality of piezoelectric elements, each said element with an input and an output, said element outputs being electrically interconnected, said elements having fixed impedance portions, the electrical characteristics of which are essentially invariant over changes in pressure and temperature;

a first transformer and a second transformer; each said transformer having an input side and an output side, the output side of said first transformer being operatively connected to the input and output of said first piezoelectric elements and the output side of said second transformer being operatively connected to the input of said second piezoelectric elements;

an oscillator circuit with a first amplifier and a second amplifier, each said amplifier having an input and an output, the output of said first amplifier being operatively connected to the input side of said first transformer and the output of said second amplifier being operatively connected to the input side of said second transformer;

a balancing circuit means for detecting harmonic frequency of said first type of piezoelectric elements by electrically balancing said fixed impedance portions of said first set of piezoelectric elements at a summing point; and a feedback circuit means for providing a feedback signal from said summing point to the input of said amplifier units.

10. A piezoelectric drive mechanism as claimed in claim 9 in which said oscillator circuit is a Meacham half bridge circuit.

11. A piezoelectric drive mechanism as claimed in claim 9 in which said feedback circuit includes a filter for selecting preferred frequencies of feedback signals.

12. A piezoelectric drive mechanism as claimed in claim 9 in which said oscillator circuit includes a means for inductively balancing said oscillator circuit so as to provide improved power factor.

13. A drive circuit for a driving a piezoelectric element at a harmonic frequency; comprising:

a Meacham half-bridge feedback circuit including a piezoelectric element and configured to produce a feedback signal; and an oscillator circuit which oscillates in response to said feedback signal at a frequency representative of a desired harmonic of the piezoelectric elements.

14. A drive circuit for a driving a piezoelectric element at a harmonic frequency as claimed in claim 13 further comprising a balancing circuit means for detecting harmonic frequency of said piezoelectric element by canceling signals produced by fixed impedance elements of said piezoelectric elements.

15. A drive circuit for a driving a piezoelectric element at a harmonic frequency as claimed in claim 13 in which said drive circuit includes a filter for selecting preferred frequencies of feedback signals.

16. A drive circuit for a driving a piezoelectric element at a harmonic frequency as claimed in claim 13 in which said oscillator circuit includes a means for inductively balancing said oscillator circuit so as to provide improved power factor.

* * * * *